(12) United States Patent
Bui

(10) Patent No.: US 7,047,428 B2
(45) Date of Patent: May 16, 2006

(54) METHOD AND APPARATUS FOR PERFORMING WAKE ON LAN POWER MANAGEMENT

(75) Inventor: Sang T. Bui, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 478 days.

(21) Appl. No.: 10/172,307

(22) Filed: Jun. 14, 2002

(65) Prior Publication Data

US 2003/0126486 A1    Jul. 3, 2003

Related U.S. Application Data

(60) Provisional application No. 60/346,099, filed on Jan. 3, 2002.

(51) Int. Cl.
*G06F 1/32* (2006.01)

(52) U.S. Cl. .................. 713/320; 713/300; 713/323
(58) Field of Classification Search ................ 713/300, 713/320, 323
See application file for complete search history.

(56) References Cited

U.S. PATENT DOCUMENTS

| 5,675,282 | A  | * | 10/1997 | Saito ........................... 327/544 |
| 5,754,552 | A  | * | 5/1998  | Allmond et al. ............. 370/465 |
| 6,049,885 | A  | * | 4/2000  | Gibson et al. .............. 713/324 |
| 6,360,106 | B1 | * | 3/2002  | Besson ........................ 455/561 |
| 6,507,591 | B1 | * | 1/2003  | Bray ........................... 370/501 |
| 6,567,855 | B1 | * | 5/2003  | Tubbs et al. ................. 709/232 |
| 6,683,904 | B1 | * | 1/2004  | Linder et al. ............... 375/139 |
| 6,690,742 | B1 | * | 2/2004  | Chan ........................... 375/295 |
| 6,732,190 | B1 | * | 5/2004  | Williams et al. ............ 709/250 |
| 6,795,450 | B1 | * | 9/2004  | Mills et al. ................. 370/463 |
| 6,883,025 | B1 | * | 4/2005  | Andra et al. ................ 709/220 |

* cited by examiner

*Primary Examiner*—Chun Cao
*Assistant Examiner*—Vincent Tran
(74) *Attorney, Agent, or Firm*—Garlick Harrison & Markison LLP; Shayne X. Short

(57) ABSTRACT

A single integrated circuit includes logic that supports 10BASE-T, 100BASE-T and 1000BASE-T transceiver functionality. The invention implements power management techniques by placing unused functionality in sleep mode. When the functionality is required later, then that functionality may be awakened again and used as required for the particular situation. A processor is able to interact with the media access controller (MAC), and the MAC then communicates with the physical layer (PHY). The invention is adaptable to various devices that are capable to operating using 10BASE-T, 100BASE-T and 1000BASE-T, even those the PHY of these devices may be somewhat different.

20 Claims, 8 Drawing Sheets

METHOD AND APPARATUS FOR PERFORMING WAKE ON LAN POWER MANAGEMENT

CROSS REFERENCE TO RELATED APPLICATIONS

The present U.S. Utility Patent Application claims priority pursuant to 35 U.S.C. §119(e) to U.S. Provisional Patent Application Ser. No. 60/346,099, entitled "METHOD AND APPARATUS FOR PERFORMING WAKE ON LAN POWER MANAGEMENT," filed Jan. 3, 2002, pending, which is hereby incorporated herein by reference in its entirety and is made part of the present U.S. Utility Patent Application for all purposes.

BACKGROUND

1. Technical Field

The invention relates generally to communications devices; and more particularly, it relates to power management in communications devices.

2. Related Art

Computer interconnectivity and communication technologies have rapidly advanced over the last few decades. In particular, Local Area Networks (LANs) are now common and serve as building blocks for much larger networks. LANs include various devices that perform communication functions; these devices include bridges, switches, routers, hubs, gateways, etc. These communication devices usually include a number of Network Interface Cards (NICs) that service one or more interfaces to other LAN devices. In some of these devices, NICs communicate with one another across communication paths located on the backside of a shared housing, such communication paths referred to generally as the back plane. The back plane serves as a data highway, providing communications paths for these interface cards to communicate with each other.

Each NIC typically includes a number of integrated circuits. These integrated circuits (computer integrated circuits) perform various communication and interface functions and support communications across the backplane. For example processor A residing on NIC A may communicate with processor B residing on NIC B via a communication path that includes the backplane, additional circuitry, and routing paths located on the NIC A and NIC B.

For equipment of differing vendors to interact properly, NICs typically operate according to at least one industry standard. The NIC typically interfaces to the LAN via a networking standard and interfaces to a host computer or other NECs via a second operating standard (across the back plane). An example of this second operating standard is the PCI Local Bus standard. The PCI Local Bus Standard sets forth the operating requirements for devices that communicate across a PCI Local Bus. Generally speaking, the PCI Local Bus is a parallel bus that services a variety of cards in addition to NICs, e.g., sound cards, gaming device cards, parallel port cards, and serial port cards, among others. Although the PCI Local Bus standard provides significant direction for communication interface, some operational aspects not addressed, e.g., power management.

In most implementations, power management is performed at lower levels of operation, e.g., Basic Input Output System (BIOS) operations, System Management Mode (SMM) code operations, etc. These operations are typically platform unique. Unfortunately, power managements performed by BIOS and SMM operations are inherently problematic in computer networking applications because they have no knowledge regarding the busy or idle status of a managed device. Such is the case because the operating system manages the busy/idle status of managed NIC(s). Thus, in computer networking applications, it makes sense to place the responsibility for power management with the operating system. However, because the computer hardware managed by the operating system is typically proprietary, the operating system generally cannot perform power management for the hardware devices of all vendors.

These problems are particularly inherent in NICs whose back planes operate according to the PCI Local Bus Specification. The PCI Local Bus Specification addresses the power consumption requirements for cards (including network cards) that interface to a PCI compliant bus. For example, the PCI Local Bus Specification sets forth 375 mA as the maximum current consumption for a Network Interface Card (NIC) connecting to a PCI Local Bus. However, the PCI Local Bus Specification standard does not dictate how this power requirement is to be met by the various integrated circuits contained on the NIC.

As NICs include more integrated circuitry that is located in increasingly smaller surface areas, it becomes harder to meet the power requirement imposed by the PCI Local Bus Standard. For example, in modern day communication integrated circuits, it is not uncommon to place the entire functionality for a transmitter/receiver (i.e., a transceiver) on a single integrated circuit. Furthermore, technology has advanced to the point where the circuitry for several transceivers may reside on a single processor. These advances not only increase the functionality of a NIC containing such integrated circuitry, but they also reduce the overall cost required to service all of the functionality.

However, a hard limitation for placing multiple transceivers (or increased functionality) on a single integrated circuit relates to power consumption. Since the PCI specification places an upper limit on the power that may be consumed by a compliant NIC, the limitations imposed thereby may limit the functionality that may be provided by a single NIC.

Further limitations and disadvantages of conventional and traditional systems will become apparent through comparison of such systems with the invention as set forth in the remainder of the present application with reference to the drawings.

BRIEF SUMMARY OF THE INVENTION

The invention provides for a method and system to manage and conserve power in a processor with substantial functionality and heavily integrated circuitry. The invention provides a technique for power management of an integrated circuit compliant with the Institute for Electrical and Electronic Engineers (IEEE) 802.3 standard. According to one embodiment, the invention is implemented in a single monolithic CMOS integrated circuit including 10BASE-T, 100BASE-T, and 1000BASE-T functionality.

Power management is accomplished in the invention by disengaging various functions of the integrated circuit and placing these functions in a mode entitled "sleep mode" when they are not required. When there is a specific use for the functionality, the logic supporting this functionality, it is reengaged by placing the integrated circuit in a mode entitled "wake mode."

For example, in one embodiment, a single integrated circuit/multi-function transceiver implements the invention. The multi-function transceiver includes 10BASE-T functionality, 100BASE-T functionality, and 1000BASE-T functionality. When the integrated circuit is using the 10BASE-T functionality, the other functionality can be put in sleep mode to conserve power. Therefore, the unused 100BASE-T and the 1000BASE-T functionality is put into sleep mode until it is required. When the system does require the 100BASE-T and the 1000BASE-T functionality, the integrated circuit wakes up the logic supporting this functionality.

Utilizing certain aspects of the invention, a higher-level processor detects when parts of the integrated circuit are not being utilized during communications. The processor signals to an interface card housing the processor, to go into sleep mode. Once the current communication is concluded, the PHY drops the link and negotiates to communicate with a subset of the integrated circuits functionality, thereby conserving power. The interaction between the processor, the physical layer (PHY), and media access controller (MAC) are as follows: the processor employs a higher level protocol interface to the MAC; the MAC then programs the PHY into the wake on LAN mode (WOL) where the PHY drops the link and re-negotiates. The processor then establishes a second link using the subset of the integrated circuits functionality. Using the subset of the integrated circuits functionality, the processor is still able to communicate packets. When additional functionality is required, the processor generates a special packet to wake the system. The unused functionality is re-engaged, and the integrated circuit is able to operate with all of its functionality. The second link is then dropped and the processor negotiates with the link partner to determine the highest level of functionality that both systems can support.

"The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings."

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
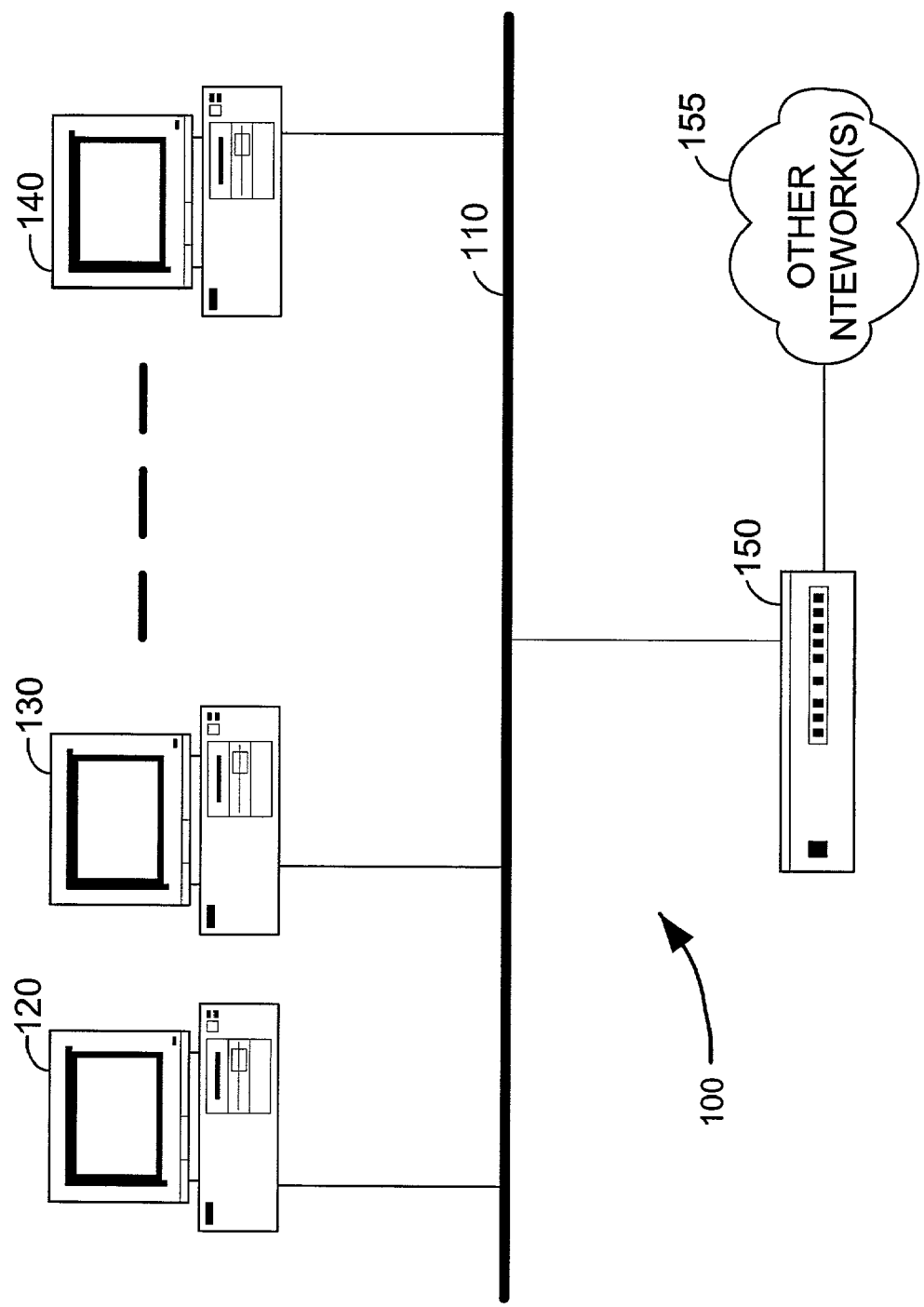
FIG. 1 is a system diagram generally illustrating a Local Area Network (LAN) having network devices that operate in accordance with certain aspects of the invention.

FIG. 1 displays a conceptual view of a Local Area network (LAN) 100. The LAN includes a number of computers 120, 130 and 140. In addition, the LAN 100 may also include a communications device such as a bridge, a router, a hub, or a gateway as shown by 150. The communications device 150 may connect the LAN 100 to other network(s) 155 that may include other LAN(s), Intranet(s), and/or the Internet itself.

In the LAN 100, the computers 120, 130, 140, and the communications device 150 transmit and receive their respective communications signals via medium 110. The medium 110 may be coaxial cable, a fiber-optic cable, twisted pair cable, etc. The computers 120, 130 and 140 each include a backplane or a bus that runs along the back or the side of the computer housing. In addition, communications device 150 may also include a backplane or a bus. The backplane connects various interface cards such as modems, mother boards, etc, within the computer housing. The backplane in these devices may conform to standards such as the PCI Local Bus standard. The PCI Local Bus standard places constraints on the devices, e.g., Network Interface Cards (NICs) that couple to the backplanes. For example, the PCI Local Bus Standard places a power consumption limitation on the cards that couple to the backplane. The method of the invention enables these NICs to meet the power consumption limitations imposed by the PCI Local Bus standard.

Computers 120, 130 and 140 use the medium 110 to communicate with each other. When two computers attempt to communicate with each other, they use standard operating protocols such as IEEE 803.3 to communicate between each other. Once the communication has been accomplished, or the link has been established, the devices are referred to as link partners. For example, computers 120 and 130 exchange packets of information, i.e., messages, for signaling and/or to transfer data between each other, making them communication partners or link partners.

Link partners are able to communicate in real-time while performing power management operations that allow the respective NICs to meet the PCI Local Bus imposed maximum power consumption limitations. Resources required to service the link of a managed link partner are maintained as operational in a "wake mode," while resources not required to service the link are placed in a "sleep mode".

Figure 2:
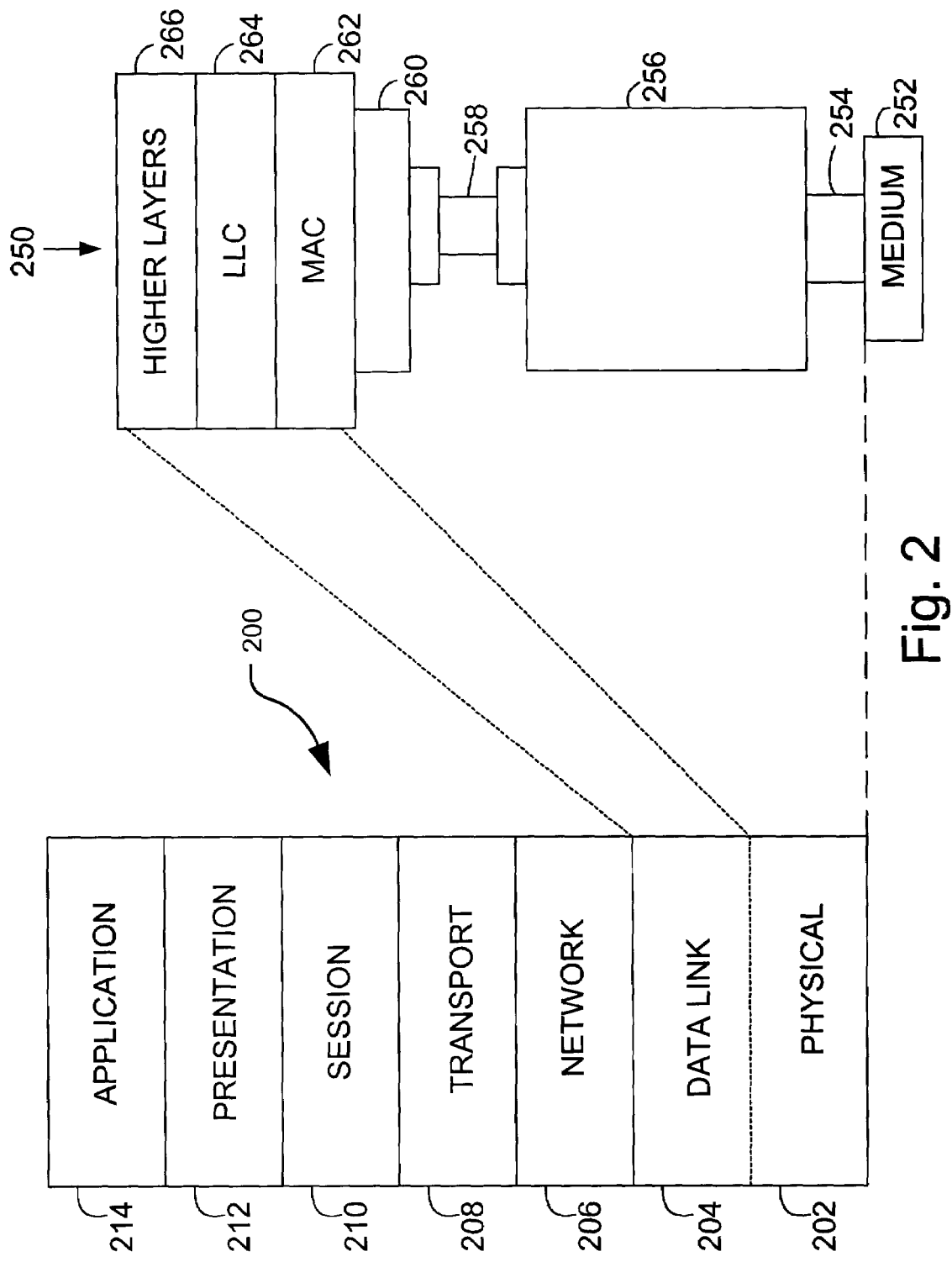
FIG. 2 is a block diagram that illustrates the mapping between the Open System Interconnection (OSI) model and the functional layers of a LAN as described in the Institute of Electrical and Electronic Engineering (IEEE) Standards and relating to certain aspects of the invention.

The IEEE standard is compliant with a reference model known as the Open System Interconnection (OSI) reference model. FIG. 2 displays a mapping of the OSI reference model 200 and the implementation of these layers in the IEEE 802.3 standard, as shown at 250. The OSI reference model breaks communications functionality into several layers such as the physical layer 202, the data link layer 204, the network layer 206, the transport layer 208, the session layer 210, the presentation layer 212, and the application layer 214. The functionality of the invention is implemented at the physical layer 202 (the PHY) as described in the IEEE 802.3.

The IEEE 802.3 model, shown at 250, facilitates the use of several mediums as depicted by 252. For example, twisted pair technology, coaxial cable technology, copper technology and fiber-optic technology are all anticipated as potential communication mediums. In addition, the IEEE 802.3 model includes communicating information at speeds such as 10 Megabit/sec, 100 megabit/set and 1000 megabit/sec, the communication speed depending upon the media employed and the capabilities of a link partner.

In the IEEE 802.3 model 250, the medium 252 interfaces into a first interface 254. The first interface 254 is a Medium Dependent Interface (MDI). The MDI 254 is a dependent interface that is established to work with a specific medium such as a coaxial cable or a twisted pair cable. The MDI 254 couples to a second interface 256. The second interface 256 is referred to as the physical layer device (PHY) in I.E.E.E. 802.3. The PHY 256 provides the means to transform data bytes provided by the higher level layers into appropriate signals for transmission on the medium 252. Likewise, the PHY 256 converts signals received from the medium 252 into appropriate data bytes before passing them to the higher level layers.

The PHY 256 includes a physical medium dependent (PMD) layer, a physical medium attachment (PMA) layer and a physical coding sub layer (PCS) in 10 Megabit/sec, 100 Megabit/sec, and 1 Gigabit/sec systems. The PCS provides the functions of data coding and decoding, which are usually independent of the physical media used. The PMA sub-layer performs symbol serialization and de-serialization. In IEEE 802.3 compliant systems, an encoded stream of symbols is serialized before transmission. Received encoded symbols are de-serialized and passed to the PCS layer. The PMD layer performs the function of converting signals from the PMA layer into the signals appropriate for the specific media. Although, the physical layer device 156 is defined differently in 10 Megabit/sec, 100 Megabit/sec, and 1 Gigabit/sec devices, all three variations may be implemented to perform the various aspects of the invention. That is to say, even though the PHY is implemented differently in these different devices, the invention is adaptable to each of the various types of PHY implementations.

The PHY 256 connects with a third interface 258 that represents a Media Independent Interface (MII) in 10 Mb/s systems and 100 Mb/s systems or a Gigabit Media Independent interface (GMII) in 1 Gb/s systems. Finally in 10 Mb/s systems, 100 Mb/s systems, and Gb/s systems a third interface 258 connect to a reconciliation layer 260. The first interface 254, the second interface 256 (the PHY), and third interface 258 are adjusted for 10 Mb/s, 100 Mb/s and 1 Gb/s systems, however, similar functionality is provided. The reconciliation layer 260 is connected to the Media Access Control (MAC) layer 262. The MAC layer 262 and a logical link layer 264 are the IEEE 802.3 implementation of the data link layer 204 of the OSI model. In addition, there are higher layers of functionality as shown by 266.

The MAC layer 262 is responsible for the enforcement of the CSMA/CD protocol. The MAC layer 262 functionality is primarily separated into two types of functionality: (1) Transmit and receive message data encapsulation and (2) Media access management. Under the transmit and receive message data encapsulation, the MAC layer 262 performs: (a) framing such as frame boundary delineation, and frame synchronization; (b) addressing such as source and destination address handling; and (c) error detection such as physical-medium transmission error. The media access management includes: (a) medium allocation such as collision avoidance and (b) contention resolution or collision handling. In the method of the invention, packets are passed between the MAC layer and the physical layer to maintain communications while portions of the integrated circuit are in sleep mode.

Figure 3:
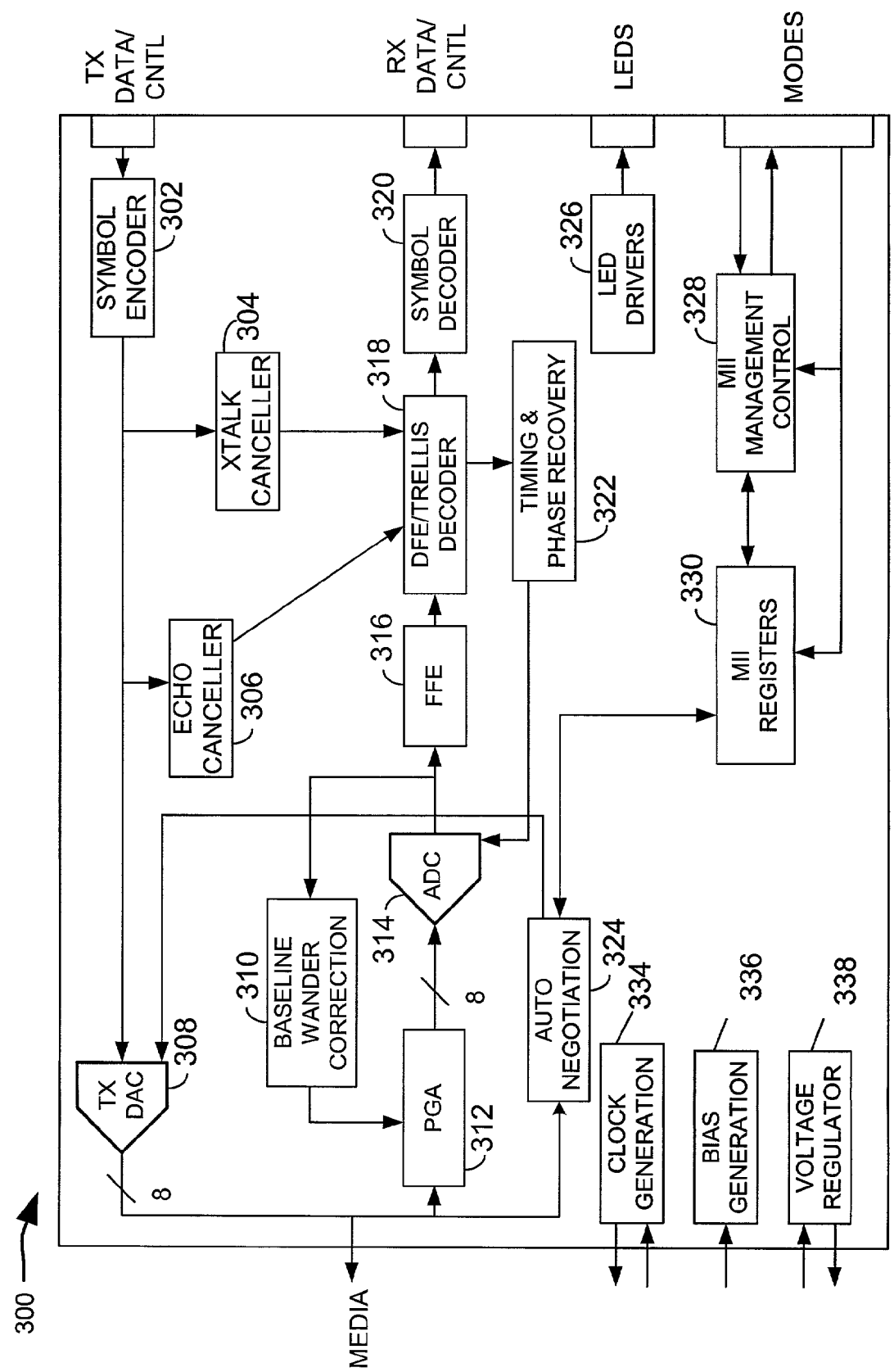
FIG. 3 is a functional block diagram illustrating an integrated circuit that operates according to certain aspects to the invention.

FIG. 3 is a functional block diagram illustrating an integrated circuit 300 that operates according to the invention. In the transmit path, the integrated circuit 300 includes a symbol encoder 302 that encodes into symbols data and control bits it receives as an incoming data stream. A transmit Digital-to-Analog Converter (DAC) 308 receives the encoded symbols from the symbol encoder 302 and performs signal shaping, which decreases unwanted high frequency signal components. In addition, the transmit DAC 308 performs pre-equalization of the encoded signal. The output of the DAC 308 is transmitted on a coupled medium.

The Analog-to-Digital Converter (ADC) 314 samples incoming data on the media after it has been gain adjusted by a Programmable Gain Amplifier 312. The output of the ADC 314 is provided to a Digital Adaptive Equalizer. The Digital Adaptive Equalizer removes inter-symbol interference created by the transmission channel media and includes the combination of a Feed Forward Equalizer 316 and a Decision Feedback Equalizer/Trellis Decoder 318. A symbol decoder 320 receives the output of the Decision Feedback Equalizer/Trellis Decoder 318 and produces received data. The Decision Feedback Equalizer/Trellis Decoder 318 also couples to a timing and phase recovery block 322. The timing and phase recovery block 322 detects timing and phase errors in the sampled received symbols and adjusts the operation of the ADC 314 to correct such detected errors.

The single integrated circuit 300 architecture of FIG. 3 supports 1000BASE-T functionality, 100BASE-T functionality, and 10BASE-T functionality. In 1000BASE-T operation, symbols are both transmitted and received on conductors of a coupled media. Such transmission and receipt of the same conductors causes cross-talk and impairment of signals. A cross talk canceller 304 removes this impairment and separates independent signals. As a result of the bi-directional nature of transmission and receipt of communications on shared conductors, an echo canceller 306 is used to remove transmitted signal impairment from an incoming receive signal.

In the monolithic integrated circuit 300, the 1000BASE-T and 100BASE-TX data streams are not always DC balanced. Because the receive signal must pass through a transformer, the DC offset of the differential receive input can wander. This effect is know as baseline wander and can greatly reduce the noise immunity of the receiver. The integrated circuit 300 includes baseline wander correction 310 that reduces the baseline wander by removing the DC offset from the input signal, and thereby significantly reduces the probability of receive symbol error. Functional blocks for timing and phase recovery 322, clock generation 334, bias generation 336, voltage regulation 338, and Light Emitting Diode circuitry (LED) 326 are also included in the integrated circuit.

The integrated circuit 300 has auto-negotiation functionality as shown at 324. The integrated circuit 300 negotiates its mode of operation using the auto-negotiation mechanism defined in the IEEE specifications. Auto-Negotiation can be enabled or disabled by hardware or software control. When the Auto-Negotiation function is enabled, the integrated circuit 300 automatically chooses the mode of operation by advertising its abilities and comparing them with those received from its link partner to establish an agreed set of capabilities with which to communicate.

The integrated circuit logic can be configured to advertise various capabilities using the auto-negotiation function. Among these capabilities are 1000BASE-T full duplex and/or half-duplex, 100BASE-T full duplex and/or half-duplex, and 10BASE-T full-duplex and/or half-duplex. A Media Independent Interface is the digital data interface between the MAC and the physical layer when functioning in the 10BASE-T and the 100BASE-T modes; the same type of interface is employed for the Gigabit Media Independent interface (GMII). The Media Independent Interface (MII) registers 330 include a superset of I.E.E.E. 802.3 compliant registers for managing the overall functionality of the integrated circuit. For example during auto-negotiation advertising is accomplished using registers 04 h (auto-negotiation advertisement) and 09h (1000BASE-T control register). These registers include information on the capability set of the initiating link partner that is then advertised.

In addition, the MII register 330 includes an auxiliary control register 18h. A specific bit (i.e. bit 3, the Wake on LAN bit) of the auxiliary control register places the integrated circuit 300 in Wake on LAN mode. In Wake on LAN mode, the integrated circuit 300 shuts down the functionality that is not being used or unnecessary for the current communications. This enables the integrated circuit to preserve power and meet the PCI Interface Local Bus imposed requirements. Finally, MII control register (register address 00 hex) includes the auto-negotiation enable and auto-negotiation restart bits required for the method of the invention. A MII Management control interface 328 contains a set of multipurpose registers for management and control.

The method of the invention enables power management, by utilizing the minimal functionality required for a specific communication. The single integrated circuit 300 has 10BASE-T functionality, 100BASE-T functionality, and 1000BASE-T functionality. According to the invention, power consumption is reduced by using the functionality of the integrated circuit 300 required for communications and placing the other functionality in a sleep mode. In such case, the functionality of the integrated circuit 300 not required to service ongoing communications is not powered and the overall power consumption of the integrated circuit 300 is reduced. When the unused functionality is required, the portions of the integrated circuit 300 that provide the additional functionality are awakened or placed in wake mode, so that the additional functionality is provided.

Generally speaking, the integrated circuit 300 may be considered to provide a 10BASE-T transceiver, a 100BASE-T transceiver, and a 1000BASE-T transceiver. Some of the components of the integrated circuit 300 may be fully used by each of these transceivers. These components may not be placed in sleep mode at any time. Some of the components of the integrated circuit 300 may be shared by two of these transceivers. These components may be placed in sleep mode only when the third transceiver is being used. Finally, some of the components of the integrated circuit are employed by only a single one of the transceivers. These components may be placed in a sleep mode when either of the two other transceivers is operational.

As is shown in FIG. 3, when fully operational, the ADC 314 samples 8 conductors of the media and the DAC 308 produces outputs that are coupled to the 8 conductors of the media. When the integrated circuit 300 operates in the 1000BASE-T mode, each of these 8 conductors of the media used and all of the functionality of the ADC 314 and the DAC 308 are required. However, when the integrated circuit 300 is operating in the 100BASE-T or 10BASE-T modes of operation, only a subset of the functionality of the ADC 314 and DAC 308 is required. In such case, a remaining portion of this functionality is not required and is placed in sleep mode. Nearly every device is affected, at least in some way, when power management is initiated. For example, some of the other devices that may be partially or fully placed in sleep mode during particular modes of operation include the PGA 312, the echo canceller 306, the FFE 316, the DFE/trellis decoder 318, the Xtalk canceller 304, the symbol encoder 302, the symbol decoder 320, and the timing and phase recovery 322, among others.

Figure 4:
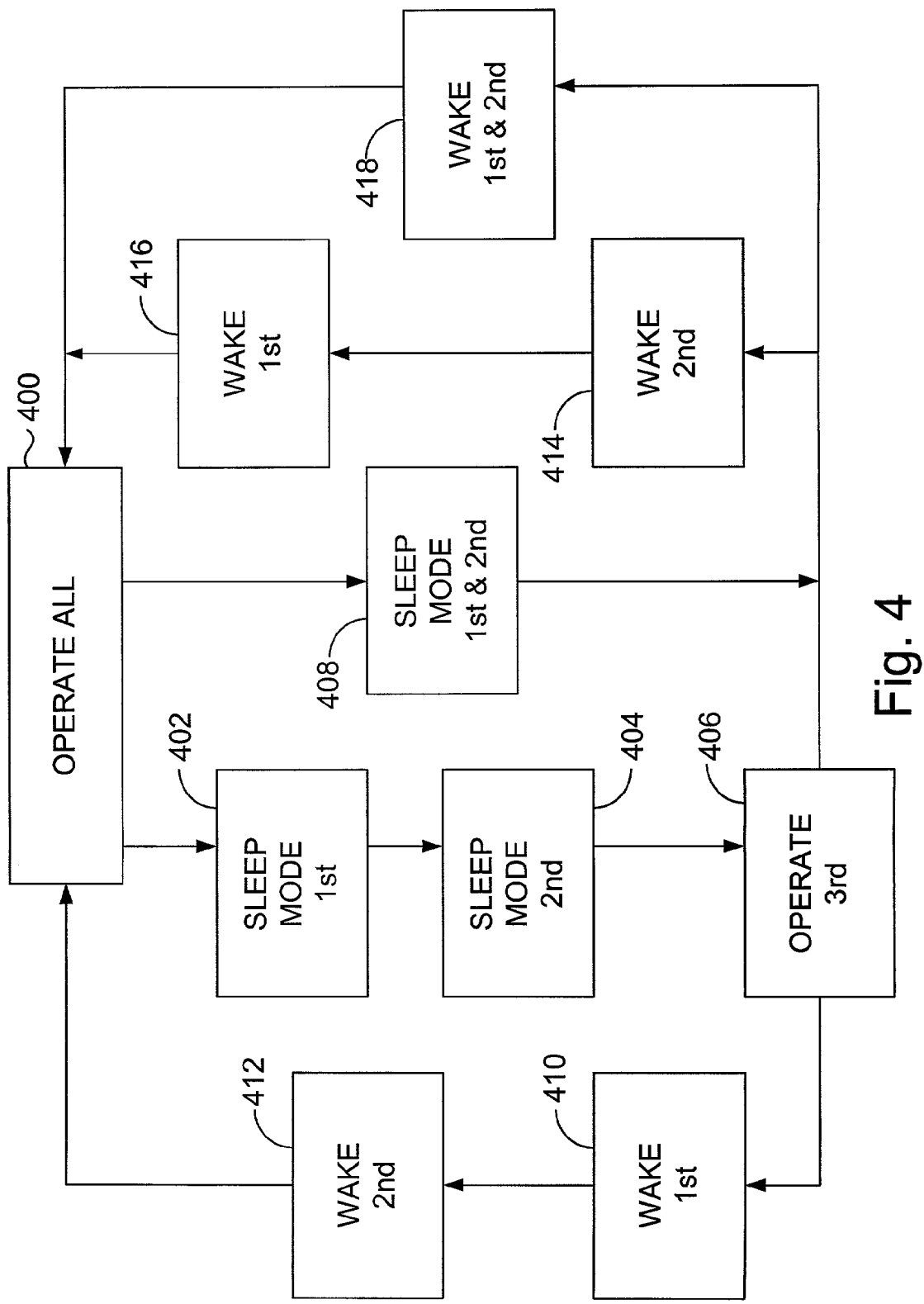
FIG. 4 is a logic diagram illustrating one embodiment of power management operations of a method that is performed in accordance with certain aspects of the invention.

FIG. 4 is a logic diagram illustrating one embodiment of power management operations of a method of the invention. In one operating condition, the integrated circuit 300 of FIG. 3 operates with all of its functionality as shown in FIG. 4 (at block 400). In such operating condition, the 10BASE-T, 100BASE-T and 1000BASE-T transceivers are all operational. When the integrated circuit 300 detects that one mode of operation is not being used, it proceeds to put the logic associated with that transceiver to sleep as shown at 402. This may mean decoupling or disconnecting the 10BASE-T functionality, the 100BASE-T functionality or the 1000BASE-T functionality. Should the system decide that one of the two remaining transceivers is unnecessary, the integrated circuit can then decide to put the second transceiver to sleep as shown at 404. For example, if the integrated circuit puts the logic that supports the 1000BASE-T functionality to sleep, then this would mean that the integrated circuit may put the 100BASE-T functionality to sleep next and just operate the third functionality or the 10BASE-T functionality as shown at 406. It should be appreciated that the logic supporting any one of the three transceiver functions can be put to sleep first as shown at 402, put to sleep second as shown at 404 or left operational as shown at 406. It should also be appreciated that the logic supporting two transceivers may be put to sleep at the same time as shown at 408. For example, both the 10BASE-T and the 100BASE-T circuitry may be put to sleep.

Ultimately, once the logic supporting different functions of the integrated circuit are put in sleep mode the integrated circuit will operate with a subset of its capabilities. Should additional capabilities be required the integrated circuit awakens the sleeping functionality. The integrated circuit may wake the logic supporting the first transceiver as shown in 410 and then wake the logic supporting the second transceiver as shown in 412. Therefore, if the integrated circuit put the 100BASE-T functionality to sleep first and the 1000BASE-T functionality to sleep next, the integrated circuit may wake the 100BASE-T functionality as indicated by 410 and then wake the 1000BASE-T functionality.

In the alternative, the integrated circuit 300 may wake the second functionality first as shown at 414 and then wake the first functionality as shown at 416. Therefore, using the current example, the integrated circuit would wake the logic supporting the 1000BASE-T functionality and then wake the logic supporting the 100BASE-T functionality. Finally, the integrated circuit may wake the logic related to both functions at the same time as shown at 418. Using our current example, this would mean that the integrated circuit would wake both the 100BASE-T and the 1000BASE-T functionality at the same time.

Figure 5:
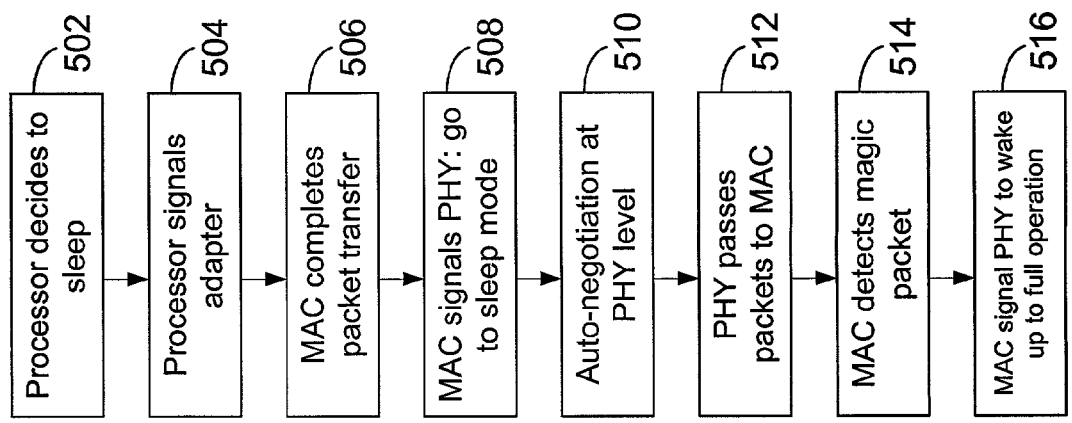
FIG. 5 is a logic diagram illustrating additional aspects of operations of the invention.

FIG. 5 is a logic diagram illustrating additional aspects of operations of the invention. In FIG. 5, an integrated circuit decides to place some of its functionality in sleep mode as shown in a block 502; it is noted that the PHY itself does not make this decision. The relationship between a processor, the PHY, and the MAC may be described as follows: the processor employs a higher level protocol interface to communicate with the MAC; the MAC communicates and interacts with the PHY; the communication between the processor and the PHY is via the MAC, and only the MAC talks with the PHY.

This would usually occur because respective functions of the processor are not operative. The processor would signal to the adapter to go to sleep as shown at 504. Since the interface may currently have a communications session going, the MAC layer completes the current packet transfer as shown at 506. Since the physical layer typically handles the physical signaling of a communications link, the MAC layer then signals to the PHY to go to sleep mode and to drop the communications link as shown at 508. The physical layer will then drop the link and then begin auto-negotiation at the PHY level, advertising a subset of the full capability of the integrated circuit as shown at 510.

Ultimately, the logic associated with the unused functionality is placed in sleep mode. However, the physical layer is still able to pass packets to the MAC layer while the other functionality is turned off as shown at 512. When the MAC receives a predetermined or "magic packet" from a higher level processor, the MAC in turn signals the physical layer to wake the logic associated with the unused functionality. Once the logic associated with the unused functionality has been awakened or re-engaged, the physical layer drops the current link and then advertises the full capability set (i.e., 10BASE-T, 100BASE-T, 1000BASE-T) and signals the PHY to wake up to full operation as shown at 516. Here, the PHY then transfers onto the MAC any information it receives. Within the wake on LAN mode (WOL), receiver circuitry and transmitter circuitry may still be enabled when in the WOL mode. In other words, in some WOL embodiments, it is only required to receive packets; other WOL embodiments operate using both receive and transfer packets. At a very minimum, the PHY is able to receive packets, and the MAC is able then to determine if it needs to wake up the device. If it is determined that the MAC is to wake up the device, then the MAC may decide to re-advertise. If it does so, then it re-sets auto-negotiation, and then the PHY drops links and does re-auto-negotiation.

Figure 6:
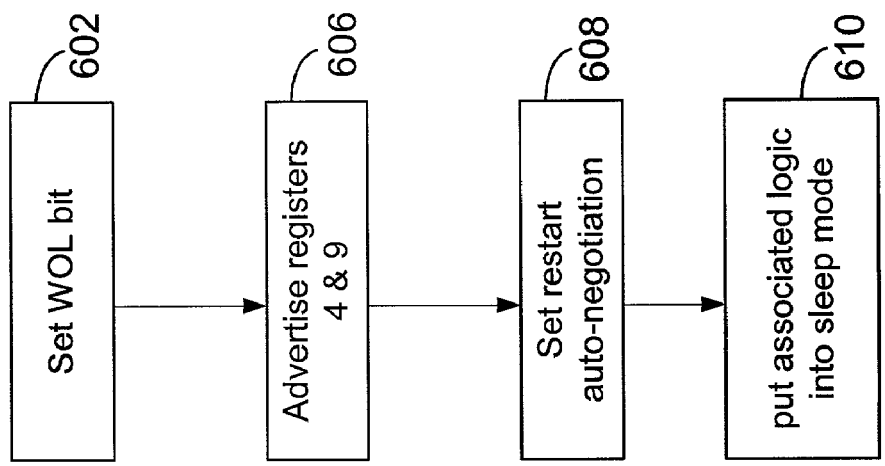
FIG. 6 is a logic diagram illustrating some operations of the invention in more detail.

FIG. 6 is a logic diagram illustrating in more detail operations of the invention. In the method of the invention, the integrated circuit is placed in both sleep and wake modes. Sleep mode refers to disengaging functionality on the integrated circuit and wake mode refers to re-engaging and using the disengaged functionality. The logic of the integrated circuit relating to specific functionality is put into sleep mode by a sequence of steps; these steps are the steps that are shown in the flow chart of the FIG. 5 in certain embodiments.

The integrated circuit first toggles the Wake on LAN bit to signal to the system that the logic related with specific functions of the integrated circuit are going into sleep mode as shown at 602. The new functionality is advertised using registers 04h and 09h as shown in 606. The restart register is set and the system auto-negotiates as shown at 608 using a subset of the integrated circuits overall functionality. The associated logic is then placed into sleep mode as shown in 610; the non-advertised functions would be those functions that are placed in sleep mode. For example, if one of the functionalities associated with the 10BASE-T, 100BASE-T, or 1000BASE-T functionality is put in sleep mode, then that associated logic is gated off. More specifically, if the 10BASE-T functionality is put in sleep mode, then the logic associated with the 10BASE-T functionality is gated off; if the 100BASE-T functionality is put in sleep mode, then the logic associated with the 100BASE-T functionality is gated off; and if the 1000BASE-T functionality is put in sleep mode, then the logic associated with the 1000BASE-T functionality is gated off. However, it is noted that one of the functionalities is employed in a given situation, and the other two functionalities that have been put in sleep mode may be gated off.

Figure 7:
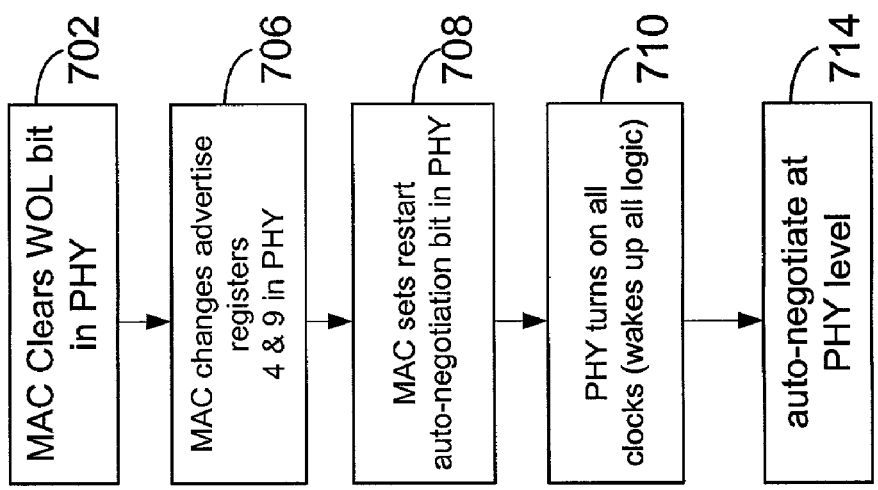
FIG. 7 is a logic diagram illustrating some operations of the invention in more detail.

FIG. 7 is a logic diagram illustrating in more detail operations of the invention. To wake the logic associated with functionality that has been placed in sleep mode, the processor takes the steps displayed in the flow chart of FIG. 7. First, the MAC clears the Wake on LAN bit in the PHY as shown at 702. The MAC changes advertise registers 4 and 9 in the PHY as shown at 706. Using the example above, the integrated circuit may now advertise, 10BASE-T, 100BASE-T, and 1000BASE-T functionality. The MAC sets the restart auto-negotiation bit in the PHY as shown at 708. The PHY then turns on all clocks at 710; the PHY wakes up all the logic in the device. Auto-negotiation is then performed at the PHY level as shown at 714.

Figure 8:
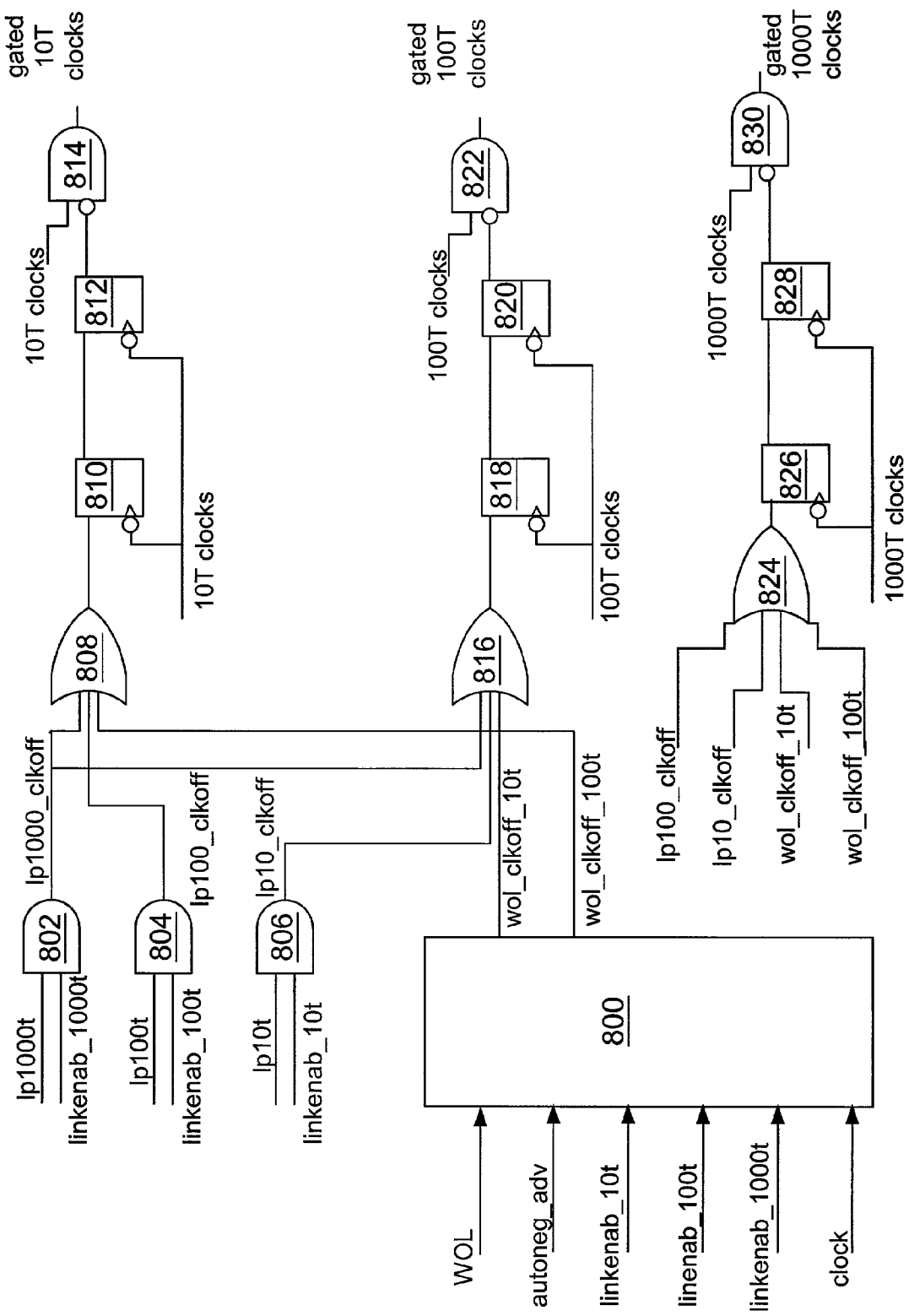
FIG. 8 is a schematic diagram illustrating components that operate to perform various aspects of the invention.

FIG. 8 is a schematic diagram illustrating components that operate according to the invention. FIG. 8 displays a circuit implementation of the invention. The circuit of FIG. 8 includes a number of variables. A definition of each variable is provided in TABLE 1 as follows:

| Variable | Definition |
| --- | --- |
| WOL | Wake on LAN |
| autoneg_adv | auto-negotiation advertisement |
| linkenab_10t | 10BASET link enable |
| linkenab_100t | 100BASET link enable |
| linkenab_1000t | 1000BASET link enable |
| lp10t | low power for 10BASET communications |
| lp100t | low power for 100BASET communications |
| lp1000t | low power for 1000BASET communications |
| lp10_clkoff | low power for 10BASET clock off |
| lp100_clkoff | low power for 100BASET clock off |
| lp1000_clkoff | low power for 1000BASET clock off |
| wol_clkoff_10t | Wake on LAN clock off for 10BASET |
| wol_clkoff_100t | Wake on LAN clock off for 100BASET |
| clock | System clock |
| 10T clocks | 10BASET clocks |
| 100T clocks | 100BASET clocks |
| 1000T clocks | 1000BASET clocks |
| gated 10T clocks | gated 10BASET clocks |
| gated 100T clocks | gated 100BASET clocks |
| gated 1000T clocks | gated 1000BASET clocks |

In FIG. 8, the circuitry 800 receives a number of inputs. Among the inputs are the (a) Wake on LAN input, which indicates that the system is going to be placed in Wake on LAN mode. The Wake on LAN mode is a mode of operation that enables the integrated circuit to gate off the logic for different functions (i.e. 10BASET, 100BASET, and 1000BASET) on the integrated circuit. This disengages the logic and circuitry associated with these functional components of the integrated circuit. The auto-negotiation advertisements (autoneg_adv) are inputs that indicate which functionality has been advertised. The link enable variables (linkenab_10t, linkenab_100t, and linkenab_1000t) indicate that the 10BASET, 100BASET or 1000BASET link has been established. Lastly, the clock input to logic circuitry 800 is the system clock for the system.

The combination of the inputs to logic circuitry 800 produces a signal to turn off the clocks for either Wake on LAN 10BASEt (wol_clkoff_10t) or Wake on LAN 100BASEt (wol_clkoff_100t). The variables (lp10t, lp100t, and lp1000t) all allow for low power operation for 10BASET, 100BASET, and 1000BASET.

In view of the above detailed description of the invention and associated drawings, other modifications and variations will now become apparent. It should also be apparent that such other modifications and variations may be effected without departing from the spirit and scope of the invention.

What is claimed is:

1. A method to operate a system that is operable to support 10 megabit functionality, 100 megabit functionality, and gigabit functionality, the method comprising:

concurrently operating the 10 megabit functionality, the 100 megabit functionality and the gigabit functionality within a device of the system when determining a mode of operation by which to establish and operate a communication link communicatively coupled to each and operable to be supported by one of the 10 megabit functionality, the 100 megabit functionality and the gigabit functionality within the device;

putting two functionalities selected from the 10 megabit functionality, the 100 megabit functionality and the gigabit functionality into sleep mode; and continuing to operate a remaining functionality selected from the 10 megabit functionality, the 100 megabit functionality and the gigabit functionality to initiate and subsequently support the determined mode of operation for the communication link, the remaining functionality not being put into sleep mode.

2. The method of claim 1, wherein the two functionalities comprise the 10 megabit functionality and the 100 megabit functionality; and the remaining functionality comprises the gigabit functionality.

3. The method of claim 1, wherein the two functionalities comprise the 10 megabit functionality and the gigabit functionality; and the remaining functionality comprises the 100 megabit functionality.

4. The method of claim 1, wherein the two functionalities comprise the 100 megabit functionality and the gigabit functionality; and the remaining functionality comprises the 10 megabit functionality.

5. The method of claim 1, further comprising:

waking up one functionality selected from the two functionalities that are initially put into sleep mode; and putting the remaining functionality, that is initially not put into sleep mode, into sleep mode.

6. The method of claim 5, wherein the one functionality, selected from the two functionalities that are initially put into sleep mode and that is now awakened, comprises 10 megabit functionality; and the remaining functionality, originally not put into sleep mode, that is now put into sleep mode comprises the 100 megabit functionality.

7. The method of claim 5, wherein the one functionality, selected from the two functionalities that are initially put into sleep mode and that is now awakened, comprises 10 megabit functionality; and the remaining functionality, originally not put into sleep mode, that is now put into sleep mode comprises the gigabit functionality.

8. The method of claim 5, wherein the one functionality, selected from the two functionalities that are initially put into sleep mode and that is now awakened, comprises 100 megabit functionality; and the remaining functionality, originally not put into sleep mode, that is now put into sleep mode comprises the 10 megabit functionality.

9. The method of claim 5, wherein the one functionality, selected from the two functionalities that are initially put into sleep mode and that is now awakened, comprises 100 megabit functionality; and the remaining functionality, originally not put into sleep mode, that is now put into sleep mode comprises the gigabit functionality.

10. The method of claim 5, wherein the one functionality, selected from the two functionalities that are initially put into sleep mode and that is now awakened, comprises gigabit functionality; and the remaining functionality, originally not put into sleep mode, that is now put into sleep mode comprises the 10 megabit functionality.

11. The method of claim 5, wherein the one functionality, selected from the two functionalities that are initially put into sleep mode and that is now awakened, comprises gigabit functionality; and the remaining functionality, originally not put into sleep mode, that is now put into sleep mode comprises the 100 megabit functionality.

12. The method of claim 1, wherein the system comprises a device, the device comprising a high level processor, a media access controller, and a physical layer; and wherein the high level processor communicates with the physical layer via the media access controller.

13. The method of claim 1, further comprising performing auto-negotiation between at least two devices within the system; and wherein the remaining functionality, selected from the 10 megabit functionality, the 100 megabit functionality and the gigabit functionality, that is not put into sleep mode, is identified during the auto-negotiation between the at least two devices within the system.

14. The method of claim 13, wherein the remaining functionality comprises the 10 megabit functionality.

15. The method of claim 13, wherein the remaining functionality comprises the 100 megabit functionality.

16. The method of claim 13, wherein the remaining functionality comprises the gigabit functionality.

17. A method to put an integrated circuit into sleep mode, the integrated circuit comprises a plurality of management registers, the plurality of management registers comprising a wake on LAN bit, a restart auto-negotiation bit, and an advertisement register, the method comprising:

setting the wake-on-LAN bit;

changing the advertisement register;

setting the restart auto-negotiation bit;

waking up each logic of a plurality of logics associated with each capability set of a plurality of capability sets when determining a mode of operation by which to establish and operate a communication link communicatively coupled to the integrated circuit that is operable to be supported by one capability set of the plurality of capability sets;

auto-negotiating a capability set of a plurality of capability sets; and gating-off logic associated with each capability set of the plurality of capability sets, except the auto-negotiated capability set that is operable to support the established communication link, after completing auto-negotiation.

18. The method of claim 17, wherein the auto-negotiated capability set comprises at least one of a 10 megabit functionality set, a 100 megabit functionality set, and a gigabit functionality set.

19. A method to wake an integrated circuit from sleep mode, the integrated circuit comprises a plurality of management registers, the plurality of management registers comprising a wake on LAN bit, a restart auto-negotiation bit, and an advertisement register, the method comprising:

clearing the wake-on-LAN bit using a media access controller;

changing the advertisement register in a physical layer by using the media access controller;

setting the restart auto-negotiation bit in the physical layer by using the media access controller;

turning on a plurality of clocks using the physical layer;

waking up each logic of a plurality of logics associated with each capability set of a plurality of capability sets when determining a mode of operation by which to establish and operate a communication link communicatively coupled to the integrated circuit that is operable to be supported by one capability set of the plurality of capability sets; and starting auto-negotiation, at the physical layer, after turning on the plurality of clocks and waking up each logic of the plurality of logics.

20. The method of claim 19, further comprising auto-negotiating a capability set of the plurality of capability sets; and wherein the capability set comprises at least one of a 10 megabit functionality set, a 100 megabit functionality set, and a gigabit functionality set.

\* \* \* \* \*